US010584407B2

(12) United States Patent
Oh et al.

(10) Patent No.: US 10,584,407 B2
(45) Date of Patent: Mar. 10, 2020

(54) ZINC ALLOY PLATED STEEL MATERIAL HAVING EXCELLENT WELDABILITY AND PROCESSED-PART CORROSION RESISTANCE AND METHOD OF MANUFACTURING SAME

(71) Applicant: POSCO, Pohang-si, Gyeongsangbuk-do (KR)

(72) Inventors: Min-Suk Oh, Gwangyang-si (KR); Sang-Heon Kim, Gwangyang-si (KR); Tae-Chul Kim, Gwangyang-si (KR); Jong-Sang Kim, Gwangyang-si (KR); Hyun-Chu Yun, Seoul (KR); Bong-Hwan Yoo, Gwangyang-si (KR); Il-Ryoung Sohn, Gwangyang-si (KR)

(73) Assignee: POSCO, Pohang-si, Gyeongsangbuk-Do (KR)

( * ) Notice: Subject to any disclaimer, the term of this patent is extended or adjusted under 35 U.S.C. 154(b) by 0 days.

(21) Appl. No.: 15/539,654

(22) PCT Filed: Dec. 24, 2015

(86) PCT No.: PCT/KR2015/014264
§ 371 (c)(1),
(2) Date: Jun. 23, 2017

(87) PCT Pub. No.: WO2016/105163
PCT Pub. Date: Jun. 30, 2016

(65) Prior Publication Data
US 2018/0002797 A1    Jan. 4, 2018

(30) Foreign Application Priority Data

Dec. 24, 2014  (KR) .................. 10-2014-0188048
Dec. 26, 2014  (KR) .................. 10-2014-0190124
Dec. 24, 2015  (KR) .................. 10-2015-0186014

(51) Int. Cl.
*C23C 2/02*  (2006.01)
*C23C 2/06*  (2006.01)
(Continued)

(52) U.S. Cl.
CPC .............. *C23C 2/06* (2013.01); *B32B 15/012* (2013.01); *B32B 15/013* (2013.01); *B32B 15/04* (2013.01);
(Continued)

(58) Field of Classification Search
CPC .... C23C 2/40; C23C 2/02; C23C 2/28; C23C 2/16; C23C 2/06; C23C 2/26;
(Continued)

(56) References Cited

U.S. PATENT DOCUMENTS 3,505,043 A    4/1970  Lee et al.
9,321,077 B2   4/2016  Jeong et al.
(Continued)

FOREIGN PATENT DOCUMENTS

EP    0072874 B1    5/1985
EP    3239346 A1    11/2017
(Continued)

OTHER PUBLICATIONS

Machine Translation, Komatsu et al., JP 2002-332555, Nov. 2002. (Year: 2002).*
(Continued)

*Primary Examiner* — Michael E. La Villa
(74) *Attorney, Agent, or Firm* — Morgan, Lewis & Bockius LLP (57) ABSTRACT

Zn alloy plated steel material having excellent weldability and processed-part corrosion resistance and a method for production of Zn alloy plated steel material are provided. In the Zn alloy plated steel material comprising base steel material and a Zn alloy plating layer, the Zn alloy plating
(Continued)

1 μm layer includes, by wt %, Al: 0.1-5.0%, Mg: 0.1-5.0%, as well as a remainder of Zn and inevitable impurities. The Zn alloy plated steel material includes a lower interface layer and an upper interface layer between the base steel material and the Zn alloy plating layer, wherein the lower interface layer is formed on the base steel material and has a dense structure, and the upper interface layer is formed on the lower interface layer and has a network-type or island-type structure.

18 Claims, 6 Drawing Sheets

(51) Int. Cl.
    C23C 2/28      (2006.01)
    C23C 28/02     (2006.01)
    C22C 38/06     (2006.01)
    C22C 18/04     (2006.01)
    C22C 38/02     (2006.01)
    C23C 30/00     (2006.01)
    C22C 38/04     (2006.01)
    B32B 15/01     (2006.01)
    B32B 15/18     (2006.01)
    B32B 15/04     (2006.01)

(52) U.S. Cl.
    CPC ............ *B32B 15/043* (2013.01); *B32B 15/18* (2013.01); *C22C 18/04* (2013.01); *C22C 38/02* (2013.01); *C22C 38/04* (2013.01); *C22C 38/06* (2013.01); *C23C 2/02* (2013.01); *C23C 2/28* (2013.01); *C23C 28/02* (2013.01); *C23C 28/021* (2013.01); *C23C 28/025* (2013.01); *C23C 30/00* (2013.01); *C23C 30/005* (2013.01); *Y10T 428/12757* (2015.01); *Y10T 428/12951* (2015.01); *Y10T 428/12972* (2015.01); *Y10T 428/12979* (2015.01); *Y10T 428/2495* (2015.01); *Y10T 428/24967* (2015.01); *Y10T 428/24975* (2015.01); *Y10T 428/263* (2015.01); *Y10T 428/264* (2015.01); *Y10T 428/265* (2015.01)

(58) Field of Classification Search
    CPC ....... C23C 30/00; C23C 30/005; C23C 28/02; C23C 28/021; C23C 28/025; C22C 38/02; C22C 38/04; C22C 38/06; C22C 18/00; C22C 18/04; B32B 15/012; B32B 15/013; B32B 15/04; B32B 15/043; B32B 15/18; Y10T 428/12951; Y10T 428/12972; Y10T 428/12979; Y10T 428/12757; Y10T 428/2495; Y10T 428/24967; Y10T 428/24975; Y10T 428/265; Y10T 428/263; Y10T 428/264
    See application file for complete search history.

(56) References Cited

U.S. PATENT DOCUMENTS

| | | |
|---|---|---|
| 2003/0155048 A1 | 8/2003 | Zeizinger et al. |
| 2008/0142125 A1* | 6/2008 | Meurer ................ C23C 2/06 148/533 |
| 2011/0274945 A1 | 11/2011 | Shimoda et al. |
| 2013/0288073 A1 | 10/2013 | Jeong et al. |
| 2013/0337287 A1* | 12/2013 | Hirata ................ C21D 8/0205 428/659 |
| 2015/0352812 A1 | 12/2015 | Jung et al. |

FOREIGN PATENT DOCUMENTS

| | | |
|---|---|---|
| JP | S55-36704 B2 | 9/1980 |
| JP | S56-96062 A | 8/1981 |
| JP | S57-10949 B2 | 3/1982 |
| JP | S61-166961 A | 7/1986 |
| JP | H04-318157 A | 11/1992 |
| JP | H06-212382 A | 8/1994 |
| JP | H06-336662 A | 12/1994 |
| JP | H07-216525 A | 8/1995 |
| JP | H11-050221 A | 2/1999 |
| JP | H11-140615 A | 5/1999 |
| JP | 2000-104154 A | 4/2000 |
| JP | 2001-140051 A | 5/2001 |
| JP | 2001-323355 A | 11/2001 |
| JP | 2002-206156 A | 7/2002 |
| JP | 2002-332555 A | 11/2002 |
| JP | 2003-183855 A | 7/2003 |
| JP | 2003-533595 A | 11/2003 |
| JP | 2006-322028 A | 11/2006 |
| JP | 2008-007842 A | 1/2008 |
| JP | 2010-070810 A | 4/2010 |
| JP | 2011-208264 A | 10/2011 |
| JP | 2014-506300 A | 3/2014 |
| JP | 2014-133259 A | 7/2014 |
| JP | 2014-208902 A | 11/2014 |
| KR | 10-2005-0042513 A | 5/2005 |
| KR | 10-2007-0029267 A | 3/2007 |
| KR | 10-2009-0122346 A | 11/2009 |
| KR | 10-2012-0074065 A | 7/2012 |
| KR | 10-2012-0074066 A | 7/2012 |
| KR | 10-2012-0074067 A | 7/2012 |
| KR | 10-2014-0008723 A | 1/2014 |
| KR | 10-1376381 B1 | 3/2014 |
| KR | 10-2014-0081617 A | 7/2014 |
| WO | 2006/002843 A1 | 1/2006 |
| WO | 2008/102009 A1 | 8/2008 |
| WO | 2010/082678 A1 | 7/2010 |
| WO | 2014/104445 A1 | 7/2014 |
| WO | 2016/105157 A1 | 6/2016 |

OTHER PUBLICATIONS

Machine Translation, Endo et al., JP 2002-206156, Jul. 2002. (Year: 2002).*
European Search Report dated Nov. 21, 2017 issued in European Patent Application No. 15873690.0.
International Search Report and Written Opinion issued in International Patent Application No. PCT/KR2015/014264, dated Apr. 1, 2016; with partial English translation.
Office Action issued in corresponding Japanese Patent Application No. 2017-533974 dated Oct. 23, 2018.
Japanese Office Action dated Jun. 4, 2019 issued in Japanese Patent Application No. 2017-533974.
Extended European Search Report dated Sep. 30, 2019 issued in European Patent Application No. 19177558.4.
Japanese Notice of Final Rejection dated Jan. 28, 2020 issued in Japanese Patent Application No. 2017-533974 (with English translation).

* cited by examiner

ZINC ALLOY PLATED STEEL MATERIAL HAVING EXCELLENT WELDABILITY AND PROCESSED-PART CORROSION RESISTANCE AND METHOD OF MANUFACTURING SAME

RELATED APPLICATIONS

This application is the U.S. National Phase under 35 U.S.C. § 371 of International Patent Application No. PCT/KR2015/014264, filed on Dec. 24, 2015, which in turn claims the benefit of Korean Patent Application Nos. 10-2014-0188048, filed on Dec. 24, 2014, 10-2014-0190124, filed on Dec. 26, 2014 and 10-2015-0186014, filed on Dec. 24, 2015, the entire disclosures of which Applications are incorporated by reference herein.

TECHNICAL FIELD

The present disclosure relates to a zinc (Zn) alloy plated steel material having excellent weldability and deformed-part corrosion resistance and to a method of manufacturing the same.

BACKGROUND ART

Since zinc (Zn) plating, suppressing the corrosion of iron (Fe) using cathodic protection, has excellent anti-corrosion performance and economic efficiency, Zn plating has commonly been used in manufacturing a steel material having high corrosion resistance. In detail, in the case of hot dip galvanized steel materials forming a plating layer in such a manner that a steel material is immersed in molten Zn, the manufacturing process thereof is simpler, and the prices of products are cheaper than an electrogalvanized steel material. Thus, demand for hot dip galvanized steel materials has increased in the automobile industry, the household appliance industry, the building materials industry, and other industries.

Hot dip galvanized steel materials plated with Zn may have the characteristics of sacrificial corrosion protection in which, when being exposed to a corrosion environment, Zn having an oxidation reduction potential lower than that of Fe is first corroded, so that the corrosion of steel materials is prevented. In addition, Zn in a plating layer may be oxidized to generate minute corrosion products on the surface of steel materials and to block steel materials from an oxidizing atmosphere, thereby improving corrosion resistance.

However, due to increased air pollution caused by industrial development, an increase of corrosive environments and strict regulations regarding resource conservation and energy savings, there is a growing need for the development of steel materials having better corrosion resistance than Zn plated steel materials of the related art.

To this end, a large amount of research into technology to manufacture Zn alloy plated steel materials having improved corrosion resistance through adding elements, such as aluminum (Al) and magnesium (Mg) to a galvanizing bath, has been conducted. A large amount of research into a technology to manufacture Zn—Al—Mg-based Zn alloy plated steel materials, as a typical Zn alloy plated material, in which Mg is added to Zn—Al plated materials has also been conducted.

However, such Zn—Al—Mg-based Zn alloy plated steel materials have weaknesses as below.

First, when Zn—Al—Mg-based Zn alloy plated steel materials are welded, cracks caused by liquid metal embrittlement (LME) may easily occur, thereby degrading weldability thereof. In other words, in a case in which Zn alloy plated steel materials described above are welded, Zn—Al—Mg-based intermetallic compounds having a relatively low melting point are dissolved and penetrate between grain boundaries of the base steel.

Second, Zn—Al—Mg-based Zn alloy plated steel materials have a low level of deformed-part corrosion resistance. In other words, such Zn alloy plated steel materials may include a large amount of Zn—Al—Mg-based intermetallic compounds generated by thermodynamic interactions of Zn, Al, and Mg in a plating layer. Since such intermetallic compounds have a relatively high degree of hardness, cracks may be generated in a plating layer during a bending process, thereby degrading deformed-part corrosion resistance.

DISCLOSURE

Technical Problem

An aspect of the present disclosure may provide a zinc (Zn) alloy plated steel material having excellent weldability and deformed-part corrosion resistance and a method of manufacturing the same.

Technical Solution

According to an aspect of the present disclosure, a zinc (Zn) alloy plated steel material comprises a base steel and a Zn alloy plating layer, the Zn alloy plating layer including, by wt %, aluminum (Al): 0.1% to 5.0%, magnesium (Mg): 0.1% to 5.0%, Zn as a residual component, and inevitable impurities. Between the base steel and the Zn alloy plating layer, a lower interface layer formed on the base steel and having a fine structure and an upper interface layer formed on the lower interface layer and having a network-type structure or an island-type structure are provided.

According to another aspect of the present disclosure, a method of manufacturing a Zn alloy plated steel material comprises providing a base steel; surface activating the base steel; obtaining the Zn alloy plated steel material by immersing the base steel that has been surface activated in a Zn alloy plating bath including, by wt %, Al: 0.1% to 5.0%, Mg: 0.1% to 5.0%, Zn as a residual component, and inevitable impurities and performing plating; and cooling the Zn alloy plated steel material after gas wiping the Zn alloy plated steel material.

Advantageous Effects

According to an aspect of the present disclosure, a Zn alloy plated steel material has significantly excellent weldability and deformed-part corrosion resistance.

BEST MODE FOR INVENTION

Hereinafter, a zinc (Zn) alloy plated steel material having excellent weldability and deformed-part corrosion resistance according to an exemplary embodiment will be described in detail.

A Zn alloy plated steel material according to an exemplary embodiment includes a base steel and a Zn alloy plating layer. In an exemplary embodiment, a type of the base steel is not specifically limited, and the base steel may be provided as a steel sheet or a steel wire rod. In the meantime, a Zn alloy plating layer may be formed on a single surface or opposing surfaces of the base steel.

In addition, in an exemplary embodiment, an alloy composition of the base steel is not specifically limited. However, in a case in which the base steel includes, a total of 0.1 wt % or more of one or more type of surface enrichment element selected from a group consisting of silicon (Si), manganese (Mn), and nickel (Ni), a portion of surface enrichment elements in the base steel is dissolved (a total of 0.001 wt % or more) in an upper interface layer and a lower interface layer formed between the base steel and a plating layer, thereby maximizing an effect of an exemplary embodiment.

The Zn alloy plating layer may include, by wt %, aluminum (Al): 0.1% to 5.0%, Mg: 0.1% to 5.0%, Zn as a residual component, and inevitable impurities.

Mg in the Zn alloy plating layer is an element playing a role in improving corrosion resistance of a plated steel material. In a case in which an Mg content is significantly low, there may be a problem in which an effect of improving corrosion resistance is insignificant. Thus, a lower limit value of the Mg content in the Zn alloy plating layer may be 0.1 wt %, in detail, 0.5 wt %, and more specifically, 0.8 wt %. However, in a case in which the Mg content is significantly high, there is a problem in which dross of a plating bath caused by oxidation of Mg in the plating bath may occur. Thus, an upper limit value of the Mg content in the Zn alloy plating layer may be 5.0 wt %, in detail, 3.0 wt %, and more specifically, 2.0 wt %.

Al in the Zn alloy plating layer is an element playing a role in suppressing dross of an Mg oxide. In a case in which an Al content is significantly low, an effect of preventing oxidation of Mg in the plating bath is insignificant. Thus, a lower limit value of the Al content in the Zn alloy plating layer may be 0.1 wt %, in detail, 0.5 wt %, and more specifically, 0.8 wt %. However, in a case in which the Al content is significantly high, there is a problem in which a temperature of the plating bath should be raised. In a case in which the temperature of the plating bath is relatively high, plating equipment may be eroded. Thus, an upper limit value of the Al content in the Zn alloy plating layer may be 5.0 wt %, in detail, 3.0 wt %, and more specifically, 2.0 wt %.

Between the base steel and the Zn alloy plating layer, the lower interface layer formed on the base steel and having a fine structure and the upper interface layer formed on the lower interface layer and having a network-type structure or an island-type structure may be provided.

A crack of liquid metal embrittlement (LME) considered to mainly be a problem during spot welding of the Zn alloy plated steel material may be effectively suppressed by forming an interface layer having a double layered structure, as described above. Even in the case in which, a crack is generated on a surface of the Zn alloy plating layer in a bending process, bending workability may be improved by effectively preventing the base steel from being outwardly exposed.

According to an exemplary embodiment, an area percentage of the upper interface layer, as compared with an area of the lower interface layer, may be in a range of 10% to 90%, in detail, in a range of 20% to 80%, in more detail, in a range of 40% to 70%, and more specifically, in a range of 45% to 65%. In this case, an area percentage refers to a ratio of an area of the upper interface layer to an area of the lower interface layer, when viewed from an upper portion of a steel material in a thickness direction thereof, for example, in the case of a flat surface, without considering three dimensional bending or the like. In a casein which the area percentage of the upper interface layer is less than 10%, the area of the upper interface layer is significantly small, so that weldability and deformed-part corrosion resistance of the Zn alloy plated steel material may be degraded. On the other hand, in a case in which the area percentage of the upper interface layer is more than 90%, a crack may be generated due to brittleness during a process.

In this case, whether the interface layer having the double layered structure, as described above, has been formed or not can be determined using a method below. In other words, since the interface layer having the double layered structure is present on an interface of the base steel and the Zn alloy plating layer, there is a limitation in confirming a structure thereof, or the like, in a case in which the Zn alloy plating layer is not removed. Thus, after an entirety of the Zn alloy plating layer was dissolved by dipping the Zn alloy plated steel material in a chromic acid solution, chemically dissolving only the Zn alloy plating layer on an upper portion of the upper interface layer for 30 seconds, while the interface layer having the double layered structure was not damaged, a scanning electron microscope (SEM) image of a residual interface layer, as described above, was taken, and it was determined whether the interface layer having the double layered structure was formed or not by analyzing an image, in order to measure a thickness of each interface layer. In this case, as an example to produce the chromic acid solution, the chromic acid solution may be produced in such a manner that one liter of distilled water is mixed with 200 g of $CrO_3$, 80 g of $ZnSO_4$, and 50 g of $HNO_3$. In the meantime, a composition of each interface layer to be subsequently described may be analyzed using energy dispersive spectroscopy (EDS), while the area percentage of the upper interface layer may be measured using an image analyzer.

According to an exemplary embodiment, the upper interface layer and the lower interface layer include an iron (Fe)—Al-based alloy. The Fe—Al-based alloy may be provided as one or more type of alloy selected from a group consisting of $Fe_2Al_5$, $FeAl_3$, and $FeAl$. In this case, when the upper interface layer and the lower interface layer include the Fe—Al-based alloy, the Fe—Al-based alloy is included as a main component (about 80 wt % or more), and the case in which other effective components or inevitable impurities are included is not excluded.

According to an exemplary embodiment, the upper interface layer may include, by wt %, Al: 15% to 80%, Fe: 20% to 85%, and Zn: 10% or less (including 0%), in detail, Al: 15% to 60%, Fe: 40% to 80%, and Zn: 10% or less (including 0%), and more specifically, Al: 20% to 40%, Fe: 60% to 80%, and Zn: 10% or less (including 0%).

In general, the Al content in an interface layer formed at an interface between the Zn alloy plating layer and the base steel is about 10 wt %. However, in the case of the Zn alloy plated steel material according to an exemplary embodiment, the Al content contained in the upper interface layer is relatively high. In a case in which the Al content in the upper interface layer is lower than 15%, an effect of reducing an LME crack may be insignificant. On the other hand, in a case in which the Al content is higher than 80%, a crack may be generated due to brittleness during a process.

According to an exemplary embodiment, a thickness of the upper interface layer may be in a range of 50 nm to 1,000 nm, in detail, in a range of 70 nm to 800 nm, in more detail, in a range of 75 nm to 450 nm, and more specifically, in a range of 90 nm to 420 nm. In a case in which the thickness of the upper interface layer is less than 50 nm, the effect of reducing the LME crack may be insignificant during welding. On the other hand, in a case in which the thickness thereof is greater than 1,000 nm, an area of a crack may become greater during a process.

According to an exemplary embodiment, a thickness of the lower interface layer may be 500 nm or less (excluding 0 nm), in detail, 300 nm or less (excluding 0 nm), and more specifically, 100 nm or less (excluding 0 nm). In a manner different from the upper interface layer, the lower interface layer should conformally cover a front surface of the base steel. However, in a case in which the thickness of the lower interface layer is greater than 500 nm, the lower interface layer is unlikely to be able to conformally cover a surface of the base steel. In the meantime, on condition that the lower interface layer conformally covers the surface of the base steel, in general, when the thickness thereof is thinner, a degree of uniformity thereof is increased. Thus, a lower limit value thereof is not specifically limited.

The Zn alloy plated steel material according to an exemplary embodiment described above may be manufactured using various methods, and a manufacturing method thereof is not specifically limited. However, the Zn alloy plated steel material may be manufactured using a method below as an implementation example.

Hereinafter, a method of manufacturing the Zn alloy plated steel material having excellent weldability and deformed-part corrosion resistance according to another exemplary embodiment will be described in detail.

Surface Activating

After a base steel is provided, the base steel is surface activated. Surface activating base steel is performed to easily form an Fe—Al-based alloy layer having a double layered structure between the base steel and a Zn alloy plating layer.

According to an exemplary embodiment, a centerline arithmetical average roughness (Ra) of a surface activated base steel may be in a range of 0.8 μm to 1.2 μm, in detail, in a range of 0.9 μm to 1.15 μm, and more specifically, in a range of 1.0 μm to 1.1 μm. In this case, the centerline arithmetical average roughness (Ra) refers to an average height from a centerline (an arithmetical mean line of a profile) to a curve of a cross section.

In addition, according to an exemplary embodiment, a ten point median height (Rz) of the surface activated base steel may be in a range of 7.5 μm to 15.5 μm. In this case, the ten point median height (RZ) refers to a distance between two parallel virtual lines passing through a third highest point and a third lowest point, respectively, in a roughness profile taken in a reference length of a cut-off portion thereof and parallel with the centerline.

In addition, according to an exemplary embodiment, a maximum height roughness (Rmax) of the surface activated base steel may be in a range of 8 μm to 16.5 μm. In this case, the maximum height roughness (Rmax) refers to a distance between two parallel virtual lines parallel with the centerline and passing through a highest point and a lowest point of a curve in the roughness profile taken in a reference length of a cut-off portion thereof.

In a case in which surface roughnesses (Ra, Rz, and Rmax) of the base steel is controlled to be within a range described above, a reaction between the base steel and a plating solution is relatively active, thereby easily forming an interface layer having a double layered structure.

In an exemplary embodiment, a method of surface activating the surface of the base steel is not specifically limited. However, in detail, a plasma treatment or an excimer laser treatment may be used. During plasma treatment or excimer laser treatment, a specific processing condition is not specifically limited. Any device and/or condition that may activate the surface of the base steel to within a range described above may be applied.

However, as a desirable example to activate the surface of the base steel, a method below may be used.

The surface activating the base steel may be performed using plasma treatment on the condition of radio frequency (RF) power in a range of 150 W to 200 W. In a case in which RF power is controlled to be within a range described above, an area percentage of an upper interface layer, as compared with an area of a lower interface layer, may be optimized, thereby securing excellent weldability and deformed-part corrosion resistance.

In addition, the surface activating the base steel may be performed in an inert gas atmosphere. In this case, the inert gas atmosphere may be provided as either a nitrogen gas ($N_2$) atmosphere or an argon (Ar) gas atmosphere. As such, in a case in which the surface activating the base steel is performed in the inert gas atmosphere, an oxide film present on the surface of the base steel is removed, thereby improving reactivity of the plating solution and the base steel. Thus, the Fe—Al-based alloy layer having a double layered structure may be easily formed between the base steel and the Zn alloy plating layer.

Forming Surface Oxide Layer

A surface oxide layer is formed on a surface of a base steel by heat treating the base steel. However, in the case of forming a surface oxide layer, if the base steel includes, by wt %, a total of 0.1% or more of one or more of type of element selected from a group consisting of Si, Mn, and Ni, surface enrichment of Si, Mn, and Ni may be carried out, thereby sufficiently dissolving Si, Mn, and Ni in an interface layer formed in a subsequent process. The forming a surface oxide layer is not essential.

In the meantime, in a case in which the forming a surface oxide layer is performed before obtaining a Zn alloy plated steel material, a process order is not specifically limited. For example, after surface activating the base steel, the surface oxide layer may be formed in a surface activated base steel. Alternatively, after the surface oxide layer is formed, the base steel in which the surface oxide layer has been formed may be surface activated.

According to an exemplary embodiment, during the heat treating the base steel, a heat treatment temperature may be in a range of 700° C. to 900° C., and in detail, in a range of 750° C. to 850° C. In a case in which the heat treatment temperature is lower than 700° C., an effect thereof may be insufficient. On the other hand, in a case in which the temperature thereof is higher than 900° C., process efficiency may be reduced.

Obtaining Zn Alloy Plated Steel Material

A surface activated base steel or a surface activated base steel in which a surface oxide layer has been formed is immersed in a Zn alloy plating bath including, by wt %, Al: 0.1% to 5.0%, Mg: 0.1% to 5.0%, Zn as a residual component, and inevitable impurities, and plating is performed, thereby obtaining a Zn alloy plated steel material.

In this case, a temperature of a plating bath of the related art may be applied to a temperature of the Zn alloy plating bath. In general, in a case in which an Al content, among components in the plating bath, is increased, a melting point is increased. Thus, internal equipment of the plating bath is eroded, thereby causing a reduction in a lifespan of a device and a defect on a surface of a Zn alloy plated steel material due to an increase in dross of an Fe alloy in the plating bath. However, since the Al content is controlled to be in a range of 0.5 wt % to 3.0 wt %, a relatively low level, it is unnecessary to set the temperature of the plating bath to be relatively high, and the temperature of the plating bath of the related art may be applied. In detail, the temperature thereof may be in a range of 430° C. to 480° C.

Subsequently, a coating weight is controlled using a gas wiping treatment of the Zn alloy plated steel material. The gas wiping treatment is to control the coating weight, and a method thereof is not specifically limited. Air or $N_2$ may be used as a gas in this case, and it is more desirable to use $N_2$ therebetween. In a case in which air is used, Mg may be first oxidized on a surface of a plating layer, thereby causing a defect on the surface of the plating layer.

Subsequently, the Zn alloy plated steel material, the coating weight of which has been controlled, is cooled. In an exemplary embodiment, during cooling described above, a cooling rate and a cooling end temperature are not specifically limited and may be set based on a cooling condition of the related art. In the meantime, during cooling described above, a cooling method is not specifically limited. In detail, cooling may be performed by using an air jet cooler, $N_2$ wiping, by spraying water mist, or the like.

Hereinafter, an exemplary embodiment will be described in more detail using an exemplary example. However, an exemplary embodiment below is intended to describe the present disclosure in more detail through illustration thereof, but not limit the scope of rights of the present disclosure, because the scope of rights thereof is determined by the contents written in the appended claims and reasonably inferred therefrom.

INDUSTRIAL APPLICABILITY

Exemplary Example 1

After, as a specimen for plating, a low carbon cold rolled steel sheet having a thickness of 0.8 mm, a width of 100 mm, and a length of 200 mm was provided, a surface thereof was surface activated using a plasma treatment. In this case, Ra, Rz, and Rmax of the surface activated base steel are illustrated in Table 1 below. Subsequently, the surface activated base steel was immersed in a Zn alloy plating bath having a composition in Table 1 below, thereby manufacturing a Zn alloy plated steel material. Subsequently, a coating weight was controlled to be 70 g/m² per side by gas wiping the Zn alloy plated steel material, and the Zn alloy plated steel material was cooled to a room temperature (about 25° C.) at an average cooling rate of 10° C./sec.

Subsequently, a composition, a thickness, and an area percentage of an interface layer of each manufactured Zn alloy plated steel material were measured, and results thereof are illustrated in Table 1 below. A measuring method is the same as a case described above.

Subsequently, weldability and deformed-part corrosion resistance of each manufactured Zn alloy plated steel material were assessed, and results thereof are illustrated in Table 2 below.

Weldability was assessed using a method below.

A welding current of 7 kA was applied using a copper (Cu)-chrome (Cr) electrode having a tip diameter of 6 mm, and welding was performed on the condition of electrode force of 2.1 kN, a welding time of 11 cycles (in this case, 1 cycle refers to 1/60 second and is the same, hereinafter) and a holding time of 11 cycles. In each exemplary example, a total of five specimens were produced. Lengths of an entirety of LME cracks occurring in five specimens were measured, and an average length of LME cracks and a maximum length of LME cracks were obtained. As a result, in a case in which the average length of LME cracks was 20 μm or less, a specimen was assessed to be "GO". In a case in which the average length of LME cracks was greater than 20 μm, a specimen was assessed to be "NG". In a case in which the maximum length of LME cracks was 100 μm or less, a specimen was assessed to be "GO". In a case in which the maximum length of LME cracks was greater than 100 μm, a specimen was assessed to be "NG".

Deformed-part corrosion resistance was assessed using a method below.

After a bending process (0T bending) of each Zn alloy plated steel material at 180° C., each bending-processed Zn alloy plated steel material was charged into a salt spray testing instrument, and a red rust occurrence time was measured based on international standard (ASTM B117-11). In this case, 5% salt water (at a temperature of 35° C. and a pH of 6.8) was used, and 2 ml/80 cm² of water was sprayed per hour. In a case in which the red rust occurrence time was 500 hours or more, the Zn alloy plated steel material was assessed to be "GO". In a case in which the red rust occurrence time was shorter than 500 hours, the Zn alloy plated steel material was assessed to be "NG".

TABLE 1

| Remarks | Surface Roughness (μm) | Composition of Plating Bath (wt %) Al | Composition of Plating Bath (wt %) Mg | Upper Interface Layer Composition (wt %) | Upper Interface Layer Thickness (nm) | Upper Interface Layer Percentage (area %) | Lower Interface Layer Composition (wt %) | Lower Interface Layer Thickness (nm) |
|---|---|---|---|---|---|---|---|---|
| Inventive Example 1 | Ra: 1.04 Rz: 8.57 Rmax: 10.5 | 1 | 1 | Al: 20.10 Fe: 77.63 Zn: 1.11 | 830 | 25 | Al: 9.8 Fe: 88.8 Zn: 1.35 | 80 |
| Comparative Example 1 | Ra: 0.56 Rz: 9.26 Rmax: 13.7 | 1 | 1 | — | — | — | Al: 10.3 Fe: 88.65 Zn: 1.01 | 50 |
| Comparative Example 2 | Ra: 1.57 Rz: 15.2 Rmax: 12.8 | 1.6 | 1.6 | — | — | — | Al: 12.5 Fe: 86.34 Zn: 1.15 | 60 |

TABLE 2

| Remarks | Weldability Average Length of LME Cracks (μm) | Weldability Maximum Length of LME Cracks (μm) | Deformed-part Corrosion Resistance Red Rust Occurrence Time (h) |
|---|---|---|---|
| Inventive Example 1 | 18 GO | 94 GO | 500 GO |
| Comparative Example 1 | 30 NG | 179 NG | 300 NG |
| Comparative Example 2 | 34 NG | 125 NG | 350 NG |

With reference to Tables 1 and 2, it can be confirmed that, in the case of Inventive Example 1 satisfying an entirety of conditions of an exemplary embodiment, an average length of LME cracks is 20 μm or less, a maximum length of LME cracks is 100 μm or less, and weldability is excellent. In addition, a red rust occurrence time is 500 hours or more, and deformed-part corrosion resistance is significantly excellent. In the meantime, it can be confirmed that, in the case of Comparative Examples 1 and 2, weldability and deformed-part corrosion resistance was degraded, since an interface layer having a double layered structure was not formed.

Figure 1:
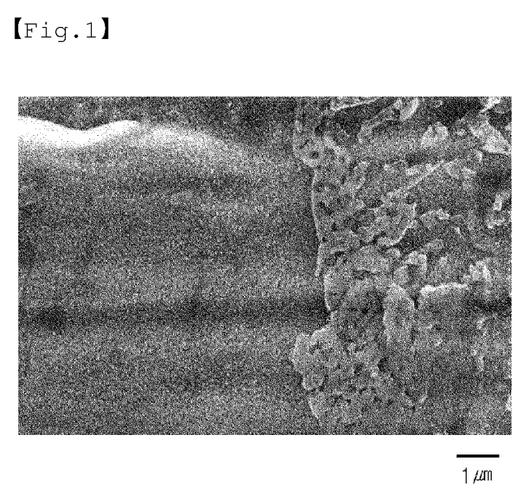
FIG. 1 is a scanning electron microscope (SEM) image of an interface layer of a zinc (Zn) alloy plated steel sheet according to Inventive Example 1 of Exemplary Example 1.
Figure 2:
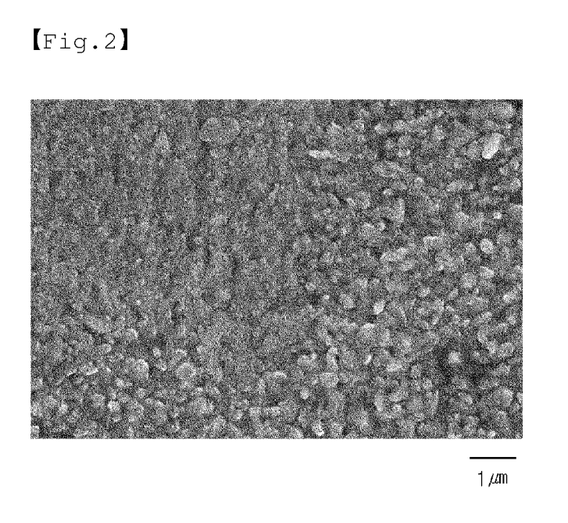
FIG. 2 is an SEM image of an interface layer of a Zn alloy plated steel sheet according to Comparative Example 1 of Exemplary Example 1.

In the meantime, FIG. 1 is an SEM image of an interface layer of a Zn alloy plated steel sheet according to Inventive Example 1 of Exemplary Example 1. FIG. 2 is an SEM image of an interface layer of a Zn alloy plated steel sheet according to Comparative Example 1 of Exemplary Example 1.

Exemplary Example 2

In order to assess a change in an area percentage of an upper interface layer depending on a condition of plasma treatment and weldability and deformed-part corrosion resistance of a Zn alloy plated steel material due to the change, the Zn alloy plated steel material was manufactured while other conditions were the same as those of Exemplary Example 1, and only a composition of a plating bath (Al of 1.4 wt %, Mg of 1.4 wt %, and Zn as a residual component) and a condition of plasma treatment were different. The condition of plasma treatment in each example is illustrated in Table 3 below.

Subsequently, a composition, a thickness, and an area percentage of an interface layer of each manufactured Zn alloy plated steel material were measured, and results thereof are illustrated in Table 3 below. A measuring method is the same as a case described above.

Subsequently, weldability and deformed-part corrosion resistance of each manufactured Zn alloy plated steel material were assessed, and results thereof are illustrated in Table 4 below. An assessment method is the same as a case described above.

TABLE 3

| Specimen No. | Condition of Plasma Treatment RF Power (W) | Condition of Plasma Treatment Atmosphere | Upper Interface Layer Composition (wt %) | Upper Interface Layer Thickness (nm) | Upper Interface Layer Percentage (area %) | Lower Interface Layer Composition (wt %) | Lower Interface Layer Thickness (nm) |
|---|---|---|---|---|---|---|---|
| 1 | 50 | Air | Al: 16 Fe: 81.5 Zn: 2.5 | 25 | 36 | Al: 11.5 Fe: 82.9 Zn: 5.6 | 60 |
| 2 | 100 | $N_2$ | Al: 25 Fe: 71.9 Zn: 3.1 | 55 | 24 | Al: 18.4 Fe: 78 Zn: 3.6 | 55 |
| 3 | 150 | $N_2$ | Al: 25.3 Fe: 72.2 Zn: 2.5 | 150 | 48 | Al: 26.4 Fe: 72.1 Zn: 1.5 | 60 |
| 4 | 200 | Ar | Al: 46.2 Fe: 50.2 Zn: 3.6 | 350 | 61 | Al: 16.4 Fe: 81.8 Zn: 1.8 | 55 |
| 5 | 250 | Ar | Al: 79 Fe: 15.2 Zn: 5.8 | 460 | 72 | Al: 9.8 Fe: 86.7 Zn: 3.5 | 55 |

TABLE 4

| Specimen No. | Weldability | | Deformed-part Corrosion |
| --- | --- | --- | --- |
| | Average Length of LME Cracks (μm) | Maximum Length of LME Cracks (μm) | Resistance Red Rust Occurrence Time (h) |
| 1 | 28.6 | 102.5 | 500 |
| 2 | 18.8 | 96.7 | 550 |
| 3 | 11 | 68 | 800 |
| 4 | 9.4 | 59 | 900 |
| 5 | 8.5 | 57 | 600 |

With reference to Tables 3 and 4, it can be confirmed that, in the case of specimens 3 and 4 in which an area percentage of an upper interface layer was controlled to be within a range of 40% to 70%, weldability and deformed-part corrosion resistance was significantly excellent as compared with other specimens.

Figure 3:
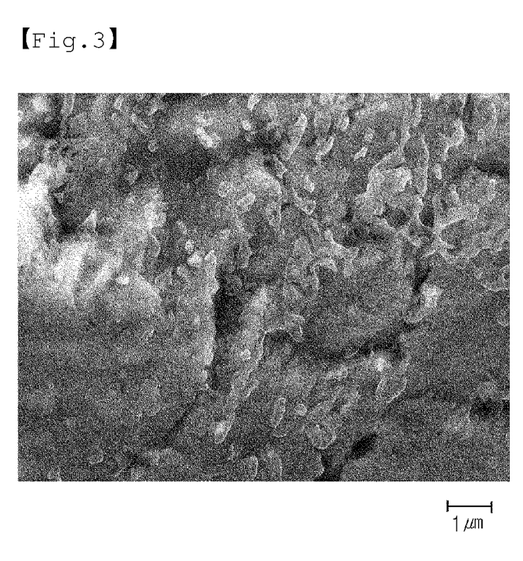
FIG. 3 is an SEM image of an interface layer of a Zn alloy plated steel sheet according to Specimen Number 1 of Exemplary Example 2.
Figure 4:
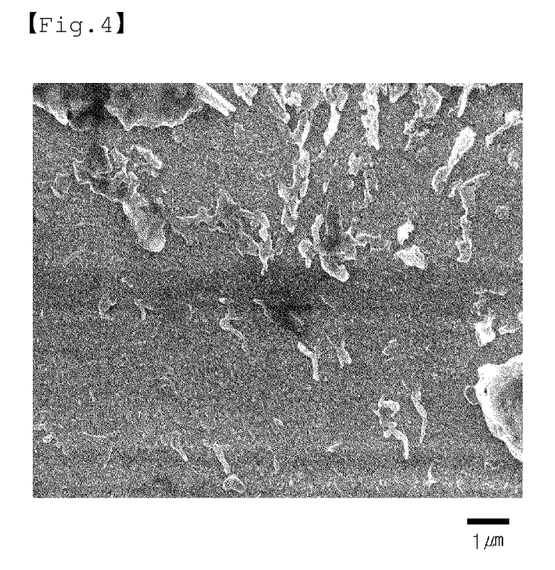
FIG. 4 is an SEM image of an interface layer of a Zn alloy plated steel sheet according to Specimen Number 2 of Exemplary Example 2.
Figure 5:
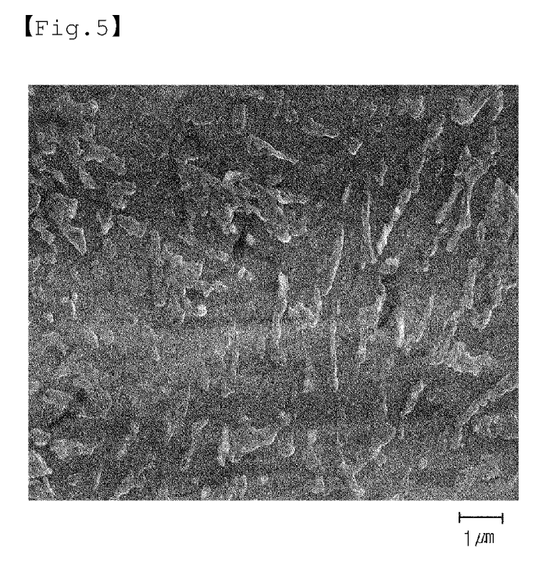
FIG. 5 is an SEM image of an interface layer of a Zn alloy plated steel sheet according to Specimen Number 3 of Exemplary Example 2.
Figure 6:
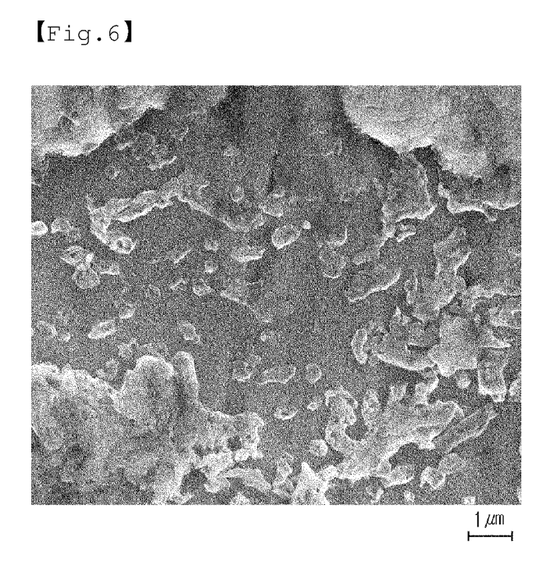
FIG. 6 is an SEM image of an interface layer of a Zn alloy plated steel sheet according to Specimen Number 4 of Exemplary Example 2.

FIG. 3 is an SEM image of an interface layer of a Zn alloy plated steel sheet according to Specimen Number 1 of Exemplary Example 2. FIG. 4 is an SEM image of an interface layer of a Zn alloy plated steel sheet according to Specimen Number 2 of Exemplary Example 2. FIG. 5 is an SEM image of an interface layer of a Zn alloy plated steel sheet according to Specimen Number 3 of Exemplary Example 2. FIG. 6 is an SEM image of an interface layer of a Zn alloy plated steel sheet according to Specimen Number 4 of Exemplary Example 2.

While exemplary embodiments have been shown and described above, it will be apparent to those skilled in the art that modifications and variations could be made without departing from the scope of the present invention as defined by the appended claims.

The invention claimed is:

1. A zinc (Zn) alloy plated steel material, comprising: a base steel and a Zn alloy plating layer, the Zn alloy plating layer including, by wt %, aluminum (Al): 0.1% to 5.0%, magnesium (Mg): 0.1% to 5.0%, Zn as a residual component, and inevitable impurities,
wherein between the base steel and the Zn alloy plating layer, a lower interface layer formed on the base steel and an upper interface layer formed on the lower interface layer are provided,
wherein the lower interface layer has a dense structure,
wherein an area percentage of the upper interface layer, as compared with an area of the lower interface layer, is in a range of 10% to 90%,
wherein a centerline arithmetical average roughness (Ra) of the base steel is in a range of 0.8 μm, to 1.2 μm, a ten point median height (Rz) is in a range of 7.5 μm 15.5 μm, and a maximum height roughness (Rmax) is in a range of 8 μm to 16.5 μm.

2. The Zn alloy plated steel material of claim 1, wherein the upper interface layer and the lower interface layer comprise an Fe—Al-based alloy, and the Fe—Al-based alloy is provided as one or more type of alloy selected from a group consisting of $Fe_2Al_5$, $FeAl_3$ and FeAl.

3. The Zn alloy plated steel material of claim 1, wherein an area percentage of the upper interface layer, as compared with an area of the lower interface layer, is in a range of 40% to 70%.

4. The Zn alloy plated steel material of claim 1, wherein the upper interface layer includes, by wt %, Al: 15% to 80%, Fe: 20% to 85%, and Zn: 10% or less (including 0%).

5. The Zn alloy plated steel material of claim 1, wherein a thickness of the upper interface layer is in a range of 50 nm to 1,000 nm.

6. The Zn alloy plated steel material of claim 1, wherein a thickness of the upper interface layer is in a range of 74 nm to 450 nm.

7. The Zn alloy plated steel material of claim 1, wherein a thickness of the lower interface layer is 500 nm or less (excluding 0 nm).

8. The Zn alloy plated steel material of claim 1, wherein the base steel comprises, by wt %, a total of 0.1% or more of one or more type of element selected from a group consisting of silicon (Si), manganese (Mn), and nickel (Ni), and the upper interface layer and the lower interface layer further comprise a total of 0.001% or more of one or more type of element selected from a group consisting of Si, Mn, and Ni.

9. A method of manufacturing a Zn alloy plated steel material, comprising:
providing a base steel;
surface activating the base steel, wherein a centerline arithmetical average roughness (Ra) of the base steel is in a range of 0.8 μm to 1.2 μm, a ten point median height (Rz) is in a range of 7.5 μm to 15.5 μm, and a maximum eight roughness (Rmax) is in a range of 8 μm to 16.5 μm;
obtaining the Zn alloy plated steel material by immersing the base steel that has been surface activated in a Zn alloy plating bath including, by wt %, Al: 0.1% to 5.0%, Mg: 0.1% to 5.0%, Zn as a residual component, and inevitable impurities and performing plating; and
cooling the Zn alloy plated steel material after gas wiping the Zn alloy plated steel material.

10. The method of claim 9, wherein the surface activating the base steel is performed using a plasma treatment or an excimer laser treatment.

11. The method of claim 9, wherein the surface activating the base steel is performed by plasma treatment on a condition of radio frequency (RF) power in a range of 150 W to 200 W.

12. The method of claim 9, wherein the surface activating the base steel is performed in an inert gas atmosphere.

13. The method of claim 12, wherein the inert gas atmosphere is provided as one among a nitrogen gas ($N_2$) atmosphere, an argon (Ar) gas atmosphere, and a mixed $N_2$ and Ar gas atmosphere.

14. The method of claim 9, wherein the base steel comprises, by wt %, a total of 0.1% or more of one or more type of element selected from a group consisting of Si, Mn, and Ni.

15. The method of claim 14, further comprising forming a surface oxide layer in such a manner that the base steel that has been surface activated is heat treated before the base steel that has been surface activated is immersed in the Zn alloy plating bath.

16. The method of claim 14, further comprising forming a surface oxide layer in such a manner that the base steel is heat treated before the base steel is surface activated.

17. The method of claim 15, wherein a heat treatment temperature is in a range of 700° C. to 900° C. during the heat treatment.

18. The method of claim 16, wherein a heat treatment temperature is in a range of 700° C. to 900° C. during the heat treatment.

* * * * *